(12) United States Patent
Ha

(10) Patent No.: US 10,396,379 B2
(45) Date of Patent: Aug. 27, 2019

(54) COOLING SYSTEM OF FUEL CELL VEHICLE

(71) Applicant: Hyundai Motor Company, Seoul (KR)

(72) Inventor: Dong Hyun Ha, Seoul (KR)

(73) Assignee: Hyundai Motor Company, Seoul (KR)

( * ) Notice: Subject to any disclaimer, the term of this patent is extended or adjusted under 35 U.S.C. 154(b) by 457 days.

(21) Appl. No.: 15/210,134

(22) Filed: Jul. 14, 2016

(65) Prior Publication Data

US 2017/0110747 A1    Apr. 20, 2017

(30) Foreign Application Priority Data

Oct. 15, 2015   (KR) ........................ 10-2015-0144238

(51) Int. Cl.

| *H01M 8/04746* | (2016.01) |
|---|---|
| *H01M 8/2484* | (2016.01) |
| *H01M 8/04225* | (2016.01) |
| *H01M 8/04302* | (2016.01) |
| *H01M 8/04029* | (2016.01) |
| *H01M 8/04007* | (2016.01) |
| *H01M 8/0432* | (2016.01) |
| *H01M 8/04992* | (2016.01) |

(52) U.S. Cl.
CPC ... *H01M 8/04768* (2013.01); *H01M 8/04029* (2013.01); *H01M 8/04067* (2013.01); *H01M 8/04225* (2016.02); *H01M 8/04302* (2016.02); *H01M 8/04358* (2013.01); *H01M 8/04992* (2013.01); *H01M 8/2484* (2016.02); *H01M 2250/20* (2013.01); *Y02T 90/32* (2013.01)

(58) Field of Classification Search
CPC .......... H01M 8/04768; H01M 8/2484; H01M 8/04225; H01M 8/04302; H01M 8/04029; H01M 8/04067; H01M 8/04358; H01M 8/04992; H01M 2250/20
See application file for complete search history.

(56) References Cited

U.S. PATENT DOCUMENTS

| 4,180,623 A * | 12/1979 | Adams ................. H01M 10/36 429/107 |
|---|---|---|
| 5,170,124 A * | 12/1992 | Blair ................. G01R 31/3658 324/434 |
| 7,981,559 B2 * | 7/2011 | Yoshida ............ H01M 8/04097 429/408 |
| 9,203,100 B2 * | 12/2015 | Kells ................. H01M 8/04037 |

(Continued)

FOREIGN PATENT DOCUMENTS

| JP | 2007-173231 A | 7/2007 |
|---|---|---|
| JP | 4243322 B2 | 3/2009 |

(Continued)

*Primary Examiner* — Anthony R Jimenez
(74) *Attorney, Agent, or Firm* — Mintz Levin Cohn Ferris Glovsky and Popeo, P.C.; Peter F. Corless

(57) ABSTRACT

A cooling system of a fuel cell vehicle is provided. The cooling system includes a stack in which a plurality of fuel cells are laminated and a manifold in which the stack is disposed, and inside of which cooling water flows to exchange heat with the stack. Additionally, a flow control valve is installed in the manifold, and is opened and closed to exchange heat of cooling water with the stack based on a temperature of the stack. A cooling water flow channel then guides the cooling water into the inside of the manifold, and is dually arranged to exchange heat with the stack.

15 Claims, 7 Drawing Sheets

(56) References Cited

U.S. PATENT DOCUMENTS

| | | |
|---|---|---|
| 2005/0221149 A1 | 10/2005 | Matsubayashi et al. |
| 2006/0257699 A1 | 11/2006 | Hood et al. |
| 2007/0141420 A1 | 6/2007 | Voss et al. |
| 2009/0274940 A1 | 11/2009 | Morita et al. |
| 2010/0167148 A1 | 7/2010 | Manabe |
| 2013/0065148 A1 | 3/2013 | Kim et al. |
| 2014/0186734 A1 | 7/2014 | Jeong et al. |

FOREIGN PATENT DOCUMENTS

| | | |
|---|---|---|
| KR | 10-0817706 B1 | 3/2008 |
| KR | 2008-0104188 A | 12/2008 |
| KR | 10-1065648 B1 | 9/2011 |
| KR | 10-2013-0020500 A | 2/2013 |
| KR | 10-1326510 B1 | 11/2013 |
| KR | 10-1448767 B1 | 10/2014 |

\* cited by examiner

COOLING SYSTEM OF FUEL CELL VEHICLE

CROSS-REFERENCE TO RELATED APPLICATION

This application claims the benefit of priority to Korean Patent Application No. 10-2015-0144238, filed on Oct. 15, 2015 in the Korean Intellectual Property Office, the disclosure of which is incorporated herein in its entirety by reference.

BACKGROUND

Field of the Invention

The present disclosure relates to a cooling system of a fuel cell vehicle, and more particularly, to a cooling system of fuel cell vehicle that actively maintains a constant heat generated in a fuel cell stack.

Description of the Related Art

An electrochemical fuel cell converts a reactant, that is, a fuel and an oxidant flow stream to generate a power and a reactant. The electrochemical fuel cell uses an electrolyte disposed between two electrodes, that is, between a cathode and an anode. Each of the electrodes includes an electrode catalyst disposed at a boundary surface between the electrolyte for inducing a desired electrochemical reaction and the electrodes. In general, the position of the electrode catalyst forms an electrochemical active range.

Generally, a polymer electrolyte membrane (PEM) fuel cell uses a membrane electrode assembly (MEA) formed of an ion-exchange membrane disposed between two electrode layers. The MEA includes a porous electrical conductive sheet material as a fluid diffusion layer such as a carbon fiber paper or a carbon cloth. In a typical MEA, the electrode layer provides a structural support for the ion-exchange membrane, and the support is, typically, thin and flexible. The membrane is ion-conductive (e.g., proton-conductive), and operates as a barrier to separate a reactant stream to one another. The membrane also operates as an electrical insulator between two electrode layers since the electrodes require electrically isolation from each other to prevent a short circuit.

The electrodes are electrically coupled to provide a path for guiding electrons between the electrodes through an external force. In the fuel cell stack, the MEA is typically disposed between two separators to which the reactant flow stream cannot penetrate physically. The separator operates as a collector and provides a support for electrode. To control the distribution to the electrochemical active range of the reactant flow stream, the surface of the separator facing the MEA may have an open-faced channel formed on the electrochemical active range. Such a channel may generally form a flow field area which corresponds to an adjacent electrochemical active range. The separator having a reactant channel formed in the electrochemical active range is known as a flow field plate.

Meanwhile, the fuel cell system includes a fuel cell stack configured to generate an electrical energy, a fuel supply system configured to supply a fuel (hydrogen) to the fuel cell stack, an air supply system configured to supply an oxygen, which is an oxidizer, in the air required for the electrochemical reaction to the fuel cell stack, and a heat and water management system configured to remove a heat of reaction of the fuel cell stack to the outside the system, and adjust an operating temperature of the fuel cell stack.

The fuel cell system having the above configuration generates electricity by an electrochemical reaction of hydrogen, which is a fuel, with oxygen in the air, and discharges a heat and water as a by-product of reaction. The fuel cell stack is a main power source of a fuel cell vehicle, and is an apparatus that produces electricity by receiving a supply of oxygen in the air and hydrogen which is fuel.

Since the fuel cell stack stably shows an optimum output effect when the cooling water adjusted to the optimum temperature is introduced into the stack, it is important to maintain the temperature of cooling water flowing into the stack at a particular temperature. Therefore, the fuel cell vehicle further includes a cooling water temperature controller in a fuel cell stack loop, configured to optimally adjust the temperature of the cooling water flowing into the stack.

Many fuel cells in the fuel cell stack are connected together in series to increase the output of an assembly. In this arrangement, one side of the plate may serve as an anode plate for one cell, and the other side may serve as a cathode plate for an adjacent cell. Additionally, the above plates may be referred to as a positive plate. However, as time is elapsed, when heat value generated in the fuel cell stack increases, and the temperature of the cooling water flowing into a bypass loop is rapidly increased, the cooling water which is cooled by being opened and closed using a proportional electromagnet is introduced to the fuel cell stack.

SUMMARY

The present disclosure provides a cooling system of a fuel cell vehicle having an improved performance and a commercial value capable of accomplishing an appropriate response based on a customer request, in a ON and OFF type using a proportional electromagnet that has a disadvantage of a difficult control of precise flow rate and location, and a disadvantage of a long lap time for balancing a temperature in a stack.

In accordance with an aspect of the present disclosure, a cooling system of a fuel cell vehicle may include: a stack in which a plurality of fuel cells are laminated; a manifold in which the stack is disposed, and inside of which cooling water flows to exchange heat with the stack; a flow control valve which is installed in the manifold, and which may be opened and closed to exchange heat of cooling water with the stack based on a temperature of the stack; and a cooling water flow channel configured to guide the cooling water into the manifold, and which is dually arranged to exchange heat with the stack.

The manifold may include a first manifold to which the cooling water may be introduced; and a second manifold configured to discharge the cooling water that exchanged heat with the stack from the first manifold. The cooling water flow channel may be formed in the same direction as an arrangement direction of the stack, in the first manifold. The stack may be disposed between the first manifold and the second manifold, and the cooling water may be introduced from the first manifold to the second manifold through the stack. The cooling water flow channel may include a normal cooling water flow channel connected directly to at least one of the stack to discharge the cooling water; and a low cooling water flow channel connected to the normal cooling water flow channel, and configured to discharge the cooling water to the normal cooling water flow channel based on the temperature of the stack.

The cooling water flow channel may include a connector configured to connect the normal cooling water flow channel and the low cooling water flow channel to adjust an amount of cooling water. The flow control valve may be installed in the connector to guide the cooling water of the low cooling water flow channel to the normal cooling water flow channel based on the temperature of the stack. The flow control valve may be implemented by a solenoid valve. Additionally, the stack may include a cooling water supply port connected to the first manifold, and connected to the normal cooling water flow channel, and may include a discharge port connected to the second manifold and configured to discharge the cooling water introduced through the cooling water supply port to cool the stack.

The system may further include a temperature sensor installed in at least one of the stack and configured to measure the temperature of the stack. The temperature sensor may be installed in the discharge port of the stack. The flow control valve may be opened and closed based on a value measured by the temperature sensor. Additionally, the system may include a collector plate disposed at one side of the stack to collect electric power from the stack and be connected to the exterior.

BRIEF DESCRIPTION OF THE DRAWINGS

The objects, features and advantages of the present disclosure will be more apparent from the following detailed description in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
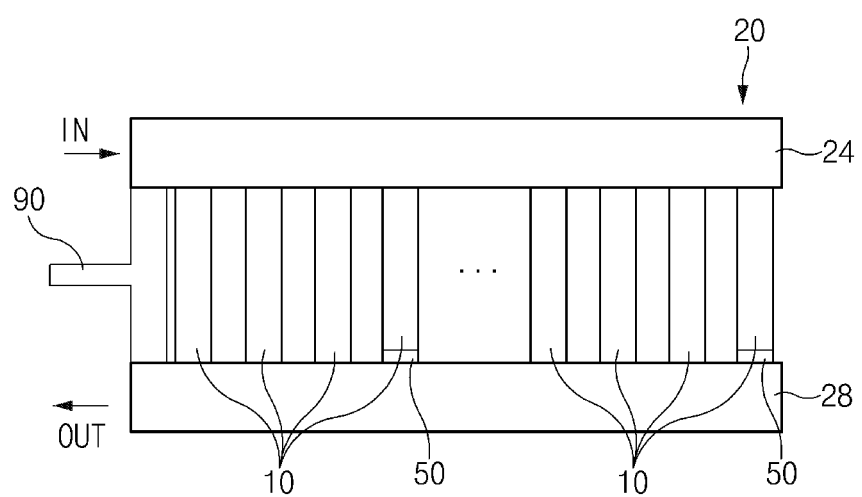
FIG. 1 is a front view illustrating a cooling system of a fuel cell vehicle according to an exemplary embodiment of the present disclosure.
Figure 2:
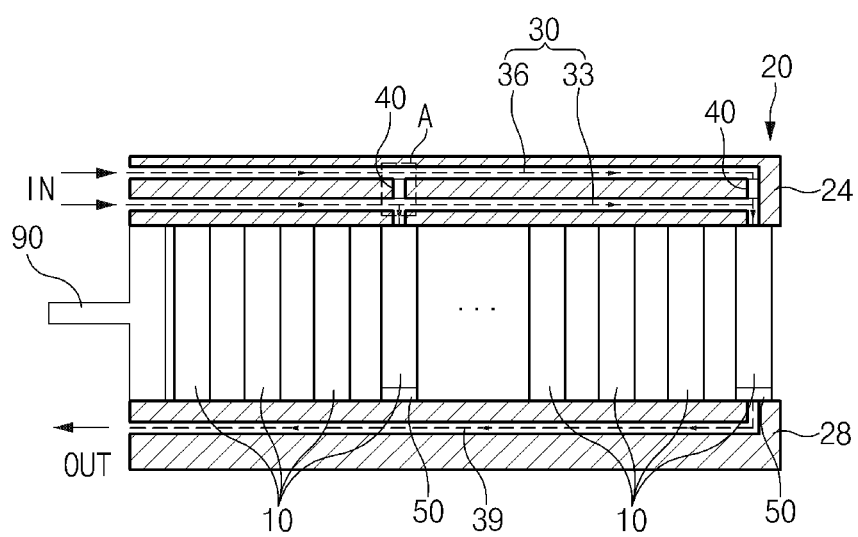
FIG. 2 is a cross-sectional view of FIG. 1 according to an exemplary embodiment of the present disclosure.

FIG. 1 is a front view illustrating a cooling system of a fuel cell vehicle according to an exemplary embodiment of the present disclosure, FIG. 2 is a cross-sectional view of FIG. 1, FIGS. 3A-3B and 4A-4B are a partially enlarged view illustrating an enlarged A of FIG. 2 and operation. A cooling system of a fuel cell vehicle may be changed by a person having ordinary skill in the art, and, in this exemplary embodiment, it may mean a cooling system of a fuel cell vehicle.

FIG. 1 is a front view illustrating a cooling system of a fuel cell vehicle according to an exemplary embodiment of the present disclosure. The cooling system of a fuel cell vehicle according to an exemplary embodiment of the present disclosure is described with reference to FIG. 1 and FIG. 2. The cooling system of a fuel cell vehicle may include a stack 10 where a plurality of fuel cells are laminated, a manifold 20 in which the stack 10 is disposed, and inside of which cooling water flows to exchange heat with the stack 10, a flow control valve 40 installed in the manifold 20, and which may be opened and closed to exchange heat of cooling water with the stack 10 based on the temperature of the stack 10, and a cooling water flow channel 30 configured to guide the cooling water into the manifold 20, and which may be dually arranged to exchange heat with the stack 10.

In particular, a plurality of fuel cells may be laminated in the stack 10. A plurality of stacks 10 may be spaced apart at regular intervals to be arranged within the manifold 20. The stack 10 may include a temperature sensor 50 configured to measure the temperature of the stack 10 and may be disposed in the manifold 20. The stack 10 may be configured to exchange heat with the cooling water introduced from the cooling water flow channel 30. The cooling water for stack 10 may be a fluid used to cool a fuel cell stack 16 while circulating the inside of the stack 10, and used to cool an electric power apparatus while circulating the inside and the perimeter of the electric power apparatus such as an inverter and a motor.

Since the heating value of the stack 10 is substantially greater than the heating value of the electric power apparatus and a condenser, the supply of cooling water to the stack 10 may be increased to discharge the heat generated from the stack 10 to thus prevent the decrease of a vehicle speed. The stack 10 may be disposed within the manifold 20, and the cooling water may flow through the inside of the stack 10 to exchange heat with the stack 10. The manifold 20 may include a first manifold 24 to which the cooling water may be introduced, and a second manifold 28 configured to discharge the cooling water which exchanged heat with the stack 10 from the first manifold 24.

Further, the cooling water flow channel 30 may be formed in the inside of the first manifold 24 to allow the cooling water to flow. The cooling water flow channel 30 of the first manifold 24 may be formed in the same direction as the arrangement direction of the stack 10. The stack 10 may be disposed between the first manifold 24 and the second manifold 28, and the cooling water may be introduced into the second manifold 28 through the stack 10 from the first manifold 24. A cooling water supply port 33b may be formed to be connected to the first manifold 24, and connected to a normal cooling water flow channel 33 which is described later to supply the cooling water to the stack 10.

Additionally, a discharge port may be formed to receive the cooling water which exchanged heat with the stack 10. An outlet may be formed to emit the cooling water introduced through the cooling water supply port 33b and exchanges heat with the stack 10. A collector plate 90 implemented at one side of the stack 10 may be disposed between the first manifold 24 and the second manifold 28 to collect electric power and be connected to the exterior. The collector plate 90 may be a metal plate used to connect to the exterior by collecting electric power from the cell stack laminated in series, may be made of a material such as stainless steel, copper, brass, and may be treated with gold plating or the like to implement a corrosion resistance and to reduce a contact resistance.

The cooling water flow channel 30 may be arranged dually in the inside of the manifold 20 (e.g., a plurality of cooling water flow channels may be provided) to induce the cooling water and allow heat to be exchanged with the stack 10. The cooling water flow channel 30 may be formed in the inside of the manifold 20 to allow the cooling water to be induced to the stack 10. The cooling water flow channel 30 may include a normal cooling water flow channel 33 connected directly to at least one of the stack 10 to discharge the cooling water, and a low cooling water flow channel 36 connected to the normal cooling water flow channel 33 and configured to discharge the cooling water to the normal cooling water flow channel 33 based on the temperature of the stack 10.

The cooling water flow channel 30 may include a connector 30a formed to connect the normal cooling water flow channel 33 and the low cooling water flow channel 36 to adjust the amount of cooling water. The connector 30a may include a flow control valve 40 configured to supply the cooling water of the low cooling water flow channel 36 to the normal cooling water flow channel 33 based on the temperature of the stack 10.

The normal cooling water flow channel 33 may be formed along the arrangement direction of the stack 10 and may be implemented in the first manifold 24. The normal cooling water flow channel 33 may include a cooling water supply port 33a directly connected to the stack 10. The cooling water supply port 33a may be formed in a vertical line of the connector 30a. The normal cooling water flow channel 33 may be directly connected to at least one of the stack 10 and may be configured to discharge the cooling water. The flow control valve 40 may be opened to directly supply the cooling water to the stack 10.

Furthermore, the low cooling water flow channel 36 may be disposed in the same direction of the normal cooling water flow channel 33 formed along the arrangement direction 33 of the stack 10. The low cooling water flow channel 36 may be connected to the normal cooling water flow channel 33 through the connector 30a to supply the cooling water to the stack 10. The low cooling water flow channel 36 may include a cooling water guide port 36a connected to the connector 30a, and may be configured to supply the cooling water to the normal cooling water flow channel 33 using the cooling water guide port 36a. The cooling water of the low cooling water flow channel 36 may be adjusted by the flow control valve 40 (e.g., the amount of cooling water may be adjusted). Meanwhile, a discharge flow channel 39 may be provided to allow the cooling water exchanged heat in the stack 10 to be discharged to the exterior of the manifold 20 through the discharge flow channel 39. The discharge flow channel 39 may be formed in the arrangement direction in which the stack 10 is disposed in the inside of the second manifold 28.

The flow control valve 40 may be disposed in the manifold 20 and may be opened and closed based on the temperature of the stack 10 to exchange the heat of the cooling water with the stack 10. The flow control valve 40 may be disposed in the first manifold 24, The flow control valve 40 may be opened and closed based on the temperature of the stack 10, and may be configured to guide (e.g., allow access to) and block the low cooling water flow channel 36 to and from the normal cooling water flow channel 33. The flow control valve 40 may be implemented in the connector 30a formed between the normal cooling water flow channel 33 and the low cooling water flow channel 36. The flow control valve 40 may be implemented by a solenoid valve. The flow control valve 40 may be opened and closed based on a value measured by a temperature sensor 50.

In particular, the flow control valve 40 may include a case 42 having a magnet of positive pole 44 provided therein, and a wire 46 disposed on the outer periphery of the case 42. The flow control valve 40 may be equipped with an elastic member 70 to move the case 42 by a magnetic field. Further, a magnet of negative pole 48 having the opposite direction of the wire 46 of the flow control valve 40 may be disposed on the inner wall of the connector 30a.

Meanwhile, as shown in FIGS. 3A-3B and 4A-4B, the wire 46 may be connected to an electrode 60 to generate a magnetic field. In other words, the electrode 60 may include a negative electrode 63 and a positive electrode 66. One end of the wire 46 may be connected to the negative electrode 63, and the other end of the wire 46 may be connected to the positive electrode 66. The electrode may be configured to apply a current by a throttle position sensor (TPS) based on a pedal engagement amount.

Figures 3A, 3B:
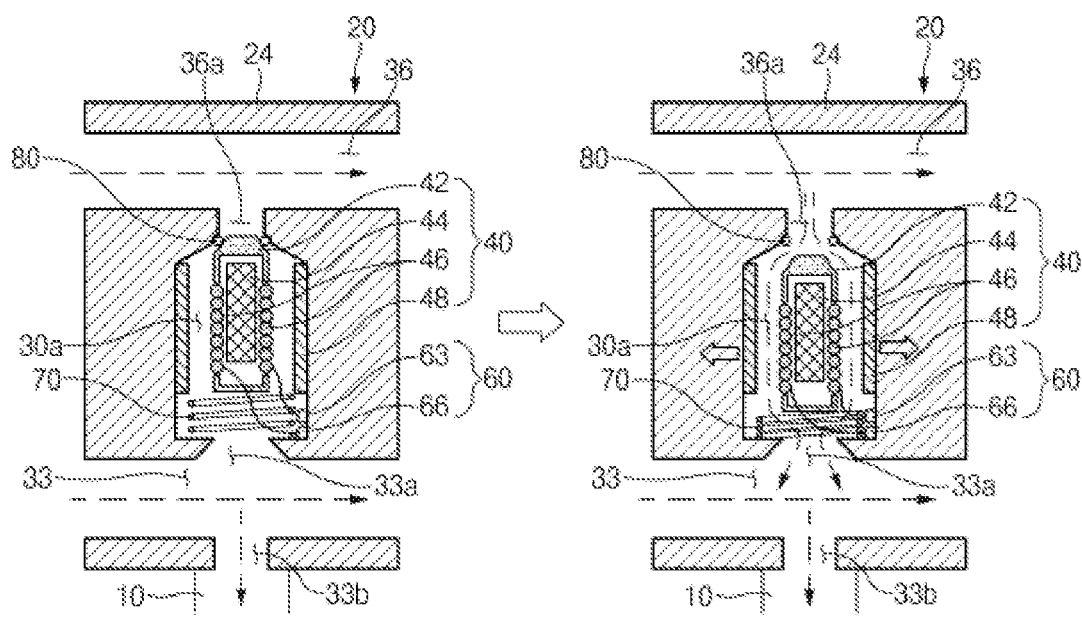
FIGS. 3A-3B and 4A-4B are a partially enlarged view illustrating an enlarged A of FIG. 2 and the operation according to an exemplary embodiment of the present disclosure.
Figures 4A, 4B:
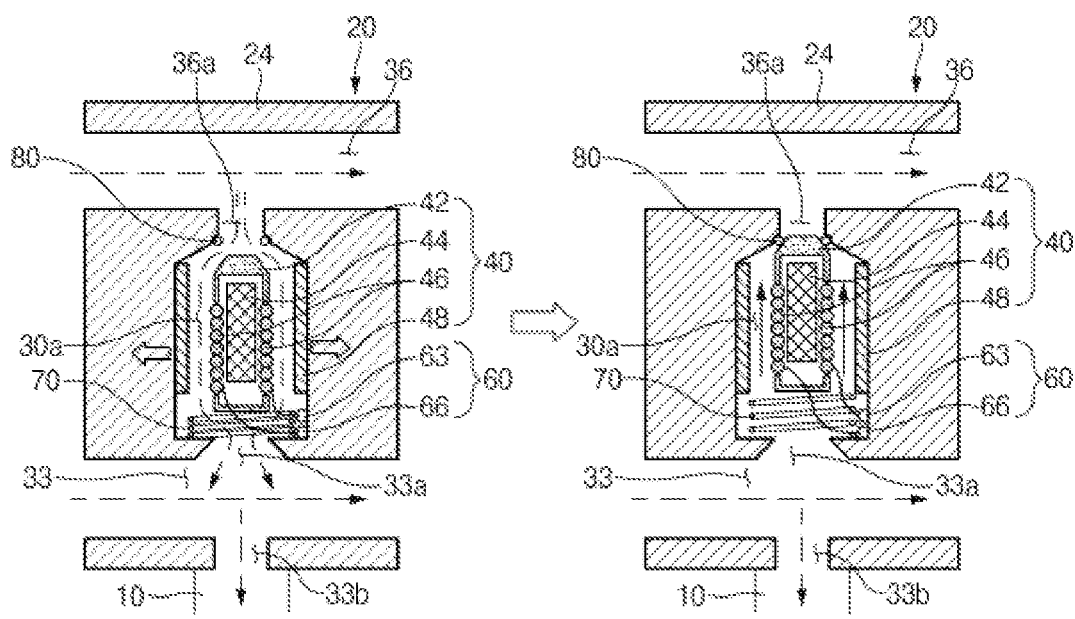

Thus, the flow control valve 40 may be configured to measure the temperature of the stack 10 using the temperature sensor 50. When the temperature is a preset temperature or greater, current may flow by the negative electrode 63 and a magnetic field may flow in the direction from the magnet of positive pole 44 to the magnet of negative pole 48, and the direction of flowing current may be an entering direction. Therefore, as shown in FIGS. 3A and 3B, a downward power may be applied to the wire.

Figure 7A:
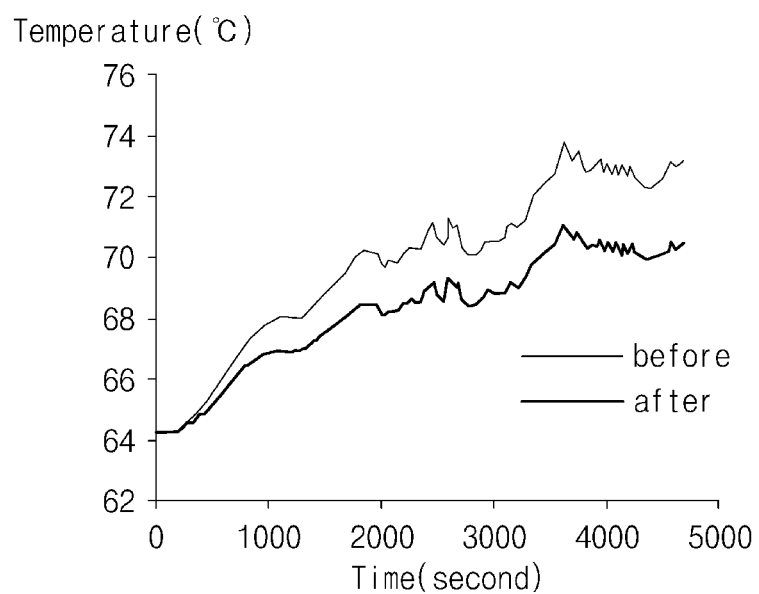
FIG. 7A to 7B is a flowchart illustrating an operation of a cooling system of a fuel cell vehicle according to the effected graph.
Figure 7B:
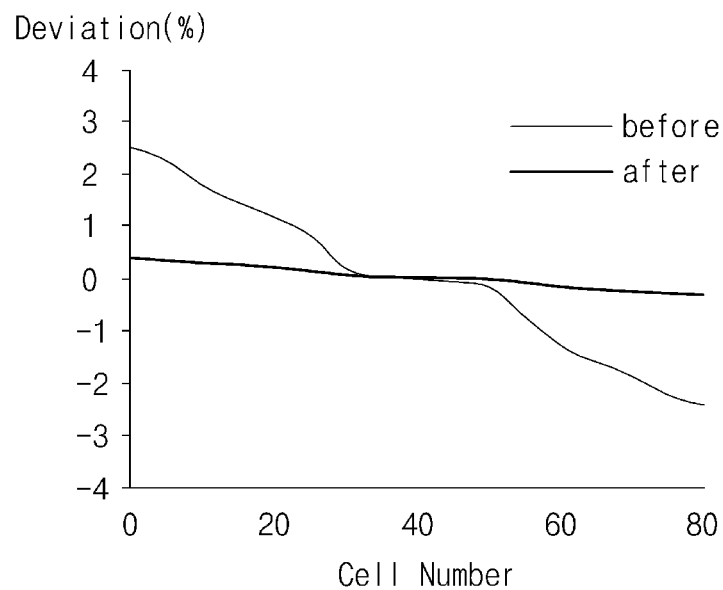

FIG. 7A to 7B is a flowchart illustrating an operation of a cooling system of a fuel cell vehicle according to the effected graph.

FIG. 7A is a flowchart illustrating an operation of a cooling system of a fuel cell vehicle according to before and after of the stack temperature. Shown is effected a cooling system control.

And FIG. 7B is cooling system to before and after improved cooling performance of the cooling supplied by a balanced stack internal temperature compensated self for the each stack Deviation. According to the cooling stack to the same temperature between the inside and the durability is improved by minimizing the gap between the stack temperature.

Accordingly, the flow control valve 40 may be opened when the case 42 closing the cooling water guide port 36a is detached after being attached. The flow control valve 40 may thus be opened to allow the cooling water to flow from the low cooling water flow channel 36 to the normal cooling water flow channel 33. Additionally, the flow control valve 40 may be configured to measure the temperature of the stack 10 using the temperature sensor 50. When the temperature is a preset temperature or greater, or a preset temperature or less, current may flow in the wire in the magnetic field by a second cable 66 to cause the magnetic field to flow in a reverse direction. In other words, the direction of the current is an emerging direction and an upward power may be applied to the wire. Thus, the case 42 opening the cooling water guide port 36a may be pushed upwardly by the elastic member to close the cooling water guide port 36a. Accordingly, the flow control valve 40 may shut off the flow of cooling water.

Particularly, the flow control valve 40 may include a rubber seal 80 disposed in the cooling water guide port 36a to prevent the cooling water from leaking from the low cooling water flow channel 36 due to a pressure of the elastic member 70. However, the elastic member 70 may be designed so that a force pushing up the case 42, that is, a reaction force may serve as a cooling water inflow circulation pressure. The temperature sensor 50 may be installed in at least one of the stack 10 to measure the temperature of the stack 10. The temperature sensor 50 may be mounted to a discharge port of the stack to measure the temperature of cooling water discharged from the stack 10.

Figure 5:
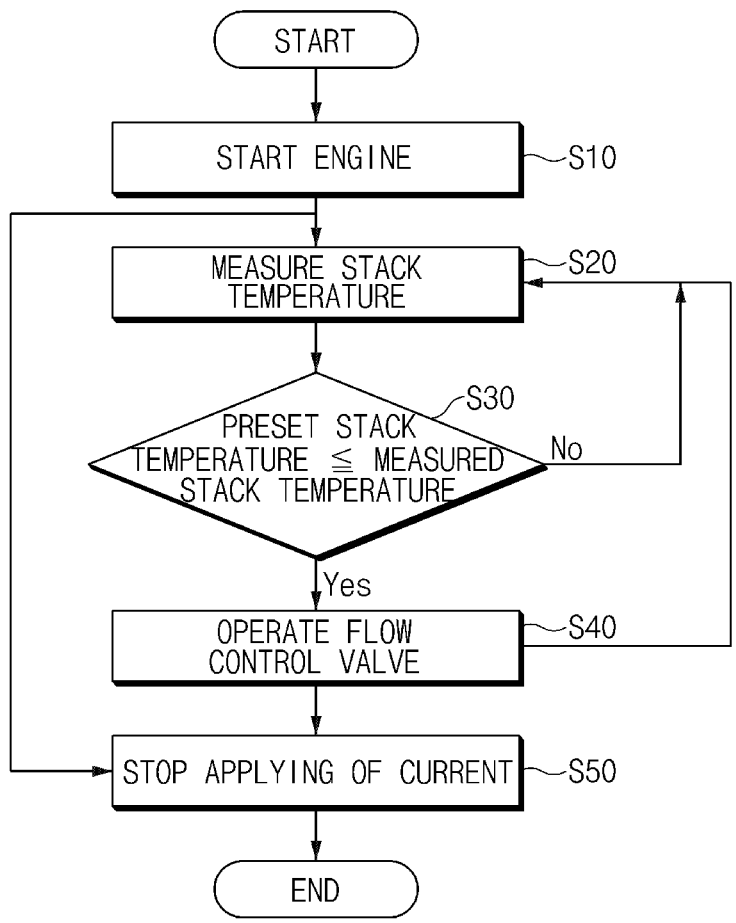
FIG. 5 is a flowchart illustrating an operation of a cooling system of a fuel cell vehicle according to an exemplary embodiment of the present disclosure.

The operation of the cooling system of a fuel cell vehicle according to the present disclosure configured as described above is described. FIGS. 3A,3B,4A and 4B are a partially enlarged view illustrating an enlarged A of FIG. 2 and the operation, and FIG. 5 is a flowchart illustrating an operation of a cooling system of a fuel cell vehicle according to an embodiment of the present disclosure.

Figure 6:
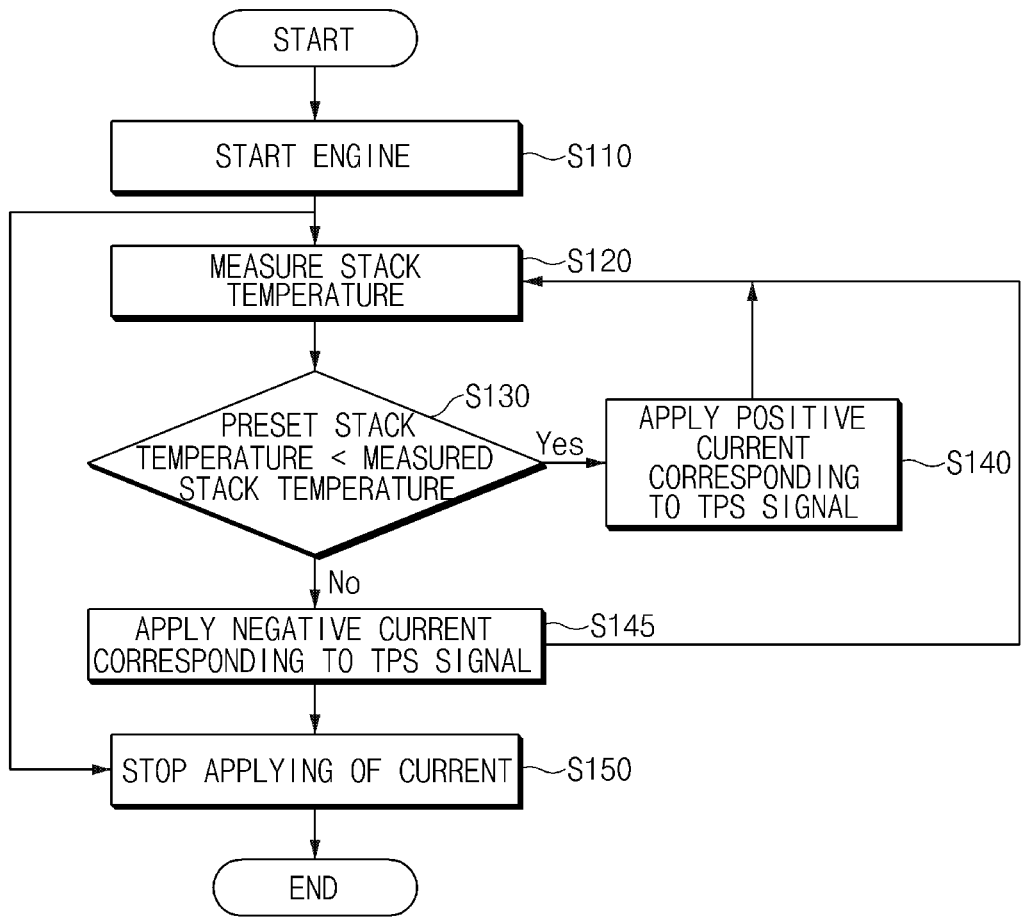
FIG. 6 is a flowchart illustrating an operation of a cooling system of a fuel cell vehicle according to another exemplary embodiment of the present disclosure.

Describing an exemplary embodiment of the cooling system of a fuel cell vehicle of the present disclosure with reference to FIGS. 3 to 5, FIGS. 3A,3B,4A and 4B are a partially enlarged view illustrating an enlarged A of FIG. 2 and the operation, and FIG. 6 is a flowchart illustrating an operation of a cooling system of a fuel cell vehicle according to another exemplary embodiment of the present disclosure.

Describing another exemplary embodiment of the cooling system of a fuel cell vehicle of the present disclosure with reference to FIGS. 3A and 3B, FIGS. 4A and 4B, and FIG. 6, an engine start signal may be received from an electronic controller to measure the temperature of the manifolds 20. The flow control valve 40 for adjusting the flow of cooling water may be opened and closed based on the temperature value of the stack 10 to adjust the temperature of the stack.

Particularly, in the measuring of the temperature of the stack 10, the cooling water may be introduced into the cooling water flow channel 30 to cool the stack 10 in the manifold 20 equipped with the stack 10, and may be divided and introduced into the normal cooling water flow channel 33 which exchanges heat with the cooling water of the cooling water flow channel 30 and the low cooling water flow channel 36 which exchanges heat with the stack 10 based on the opening and closing of the flow control valve 40.

In the adjusting of the temperature of the stack 10, after a temperature value is previously set in the temperature sensor 50 configured to measure the temperature of the stack 10, when the temperature of the stack 10 exceeds a preset temperature, the flow control valve 40 may be opened. In other words, when the temperature of the stack 10 exceeds a preset temperature, the flow control valve 40 may be opened to guide the cooling water of the low cooling water flow channel 36 to the stack 10 through the normal cooling water flow channel 33, by applying a throttle position sensor (TPS) signal that corresponds to the pedal effort of the accelerator (e.g., the amount of force or pressure exerted onto the pedal) as a positive current.

Meanwhile, in the adjusting of the temperature of the stack 10, after a temperature value is previously set in the temperature sensor 50 configured to measure the temperature of the stack 10, when the temperature of the stack 10 is a preset temperature or less, the flow control valve 40 may be closed. In other words, when the temperature of the stack 10 is a preset temperature or less, the flow control valve 40 may be closed to prevent the cooling water of the low cooling water flow channel 36 from flowing to the normal cooling water flow channel 33, by applying a current that corresponds to a throttle position sensor (TPS) signal as a negative current based on the pedal effort of the accelerator.

According to the cooling system of a fuel cell vehicle, a cooling water flow channel may be formed to minimize a lap time of a temperature in the stack to improve the stack durability and performance. Additionally, a linear type may be applied so that it may be possible to control a more precise flow rate and location to improve a performance. It may also be possible to compensate the temperature of the stack without a separate controller to thus simplify a structure and improve a commercial value.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A cooling system of a fuel cell vehicle, comprising:
   a stack in which a plurality of fuel cells are laminated;
   a manifold in which the stack is disposed, and an inside of which cooling water flows to exchange heat with the stack;
   a flow control valve installed in the manifold, and is opened and closed to exchange heat of cooling water with the stack based on a temperature of the stack; and
   a cooling water flow channel configured to guide the cooling water into the manifold, and which is dually arranged to exchange heat with the stack,
   wherein the cooling water flow channel includes:
   a normal cooling water flow channel connected directly to at least one of the stack to discharge the cooling water;
   a low cooling water flow channel connected to the normal cooling water flow channel and configured to discharge the cooling water to the normal cooling water flow channel based on the temperature of the stack; and
   a connector connecting the normal cooling water flow channel and the low cooling water flow channel, wherein a temperature of the cooling water flowing through the low cooling water flow channel is kept lower than a temperature of the cooling water flowing through the normal cooling water flow channel with the stack in operation, and wherein the flow control valve is installed in the connector to adjust a flow of the cooling water from the low cooling water flow channel to the normal cooling water flow channel based on the temperature of the stack.

2. The system of claim 1, further comprising:
a collector plate disposed at one side of the stack to collect electric power from the stack and to be connected to an outside.

3. The system of claim 1, wherein the flow control valve is implemented by a solenoid valve.

4. The system of claim 1, wherein the manifold includes:
a first manifold to which the cooling water is introduced; and
a second manifold configured to discharge the cooling water that exchanged heat with the stack from the first manifold,
wherein the cooling water flow channel is formed in the same direction as an arrangement direction of the stack, in the first manifold.

5. The system of claim 4, wherein the stack is disposed between the first manifold and the second manifold, and the cooling water is introduced from the first manifold to the second manifold through the stack.

6. The system of claim 4, wherein the stack includes a cooling water supply port connected to the first manifold, and connected to the normal cooling water flow channel, and includes a discharge port connected to the second manifold, and configured to discharge the cooling water introduced through the cooling water supply port to cool the stack.

7. The system of claim 6, further comprising:
a temperature sensor installed in at least one of the stack and configured to measure the temperature of the stack.

8. The system of claim 7, wherein the temperature sensor is mounted in the discharge port of the stack.

9. The system of claim 7, wherein the flow control valve is opened and closed based on a value measured by the temperature sensor.

10. A method for controlling a cooling system of a fuel cell vehicle, the cooling system comprising a stack in which a plurality of fuel cells are laminated and a cooling water flow channel which includes:
a normal cooling water flow channel connected directly to at least one of the stack to discharge the cooling water;
a low cooling water flow channel connected to the normal cooling water flow channel and configured to discharge the cooling water to the normal cooling water flow channel based on the temperature of the stack; and
a connector connecting the normal cooling water flow channel and the low cooling water flow channel,
the method comprising:
receiving, by a controller, an engine start signal and measuring a temperature of a stack disposed in a manifold; and
controlling, by the controller, a flow control valve installed in the connector to adjust a flow of the cooling water from the low cooling water flow channel to the normal cooling water flow channel based on the temperature of the stack.

11. The method of claim 10, wherein the measuring the temperature of the stack includes:
introducing a cooling water into the cooling water flow channel for cooling the stack in the manifold equipped with the stack,
wherein, in the step of introducing the cooling water into the cooling water flow channel, the cooling water is divided and introduced into the normal cooling water flow channel and the low cooling water flow channel which exchanges heat with the stack based on the opening and closing of the flow control valve.

12. The method of claim 10, wherein the controlling of the flow control valve includes:
opening, by the controller, the flow control valve, when a temperature of the stack exceeds a preset temperature, after a temperature value is previously set in a temperature sensor configured to measure the temperature of the stack.

13. The method of claim 12, wherein the flow control valve is opened to guide the cooling water of the low cooling water flow channel to the stack through the normal cooling water flow channel, by applying a current that corresponds to a throttle position sensor (TPS) signal as a positive current, when the temperature measuring the stack exceeds a preset temperature.

14. The method of claim 10, wherein the controlling of the flow control valve includes:
closing, by the controller, the flow control valve, when a temperature of the stack is a preset temperature or less, after a temperature value is previously set in the temperature sensor.

15. The method of claim 14, wherein the flow control valve is closed to prevent the cooling water of the low cooling water flow channel from flowing to the normal cooling water flow channel, by applying a current that corresponds to a throttle position sensor (TPS) signal as a negative current, when the temperature measuring the stack is a preset temperature or less.

* * * * *